April 12, 1960      K. H. SCOTT      2,932,042

MEAT CLEANING MACHINE

Filed Feb. 28, 1957      2 Sheets-Sheet 2

INVENTOR
Kenneth H. Scott

BY *Ralph T. Bassett*

ATTORNEY

', ...

United States Patent Office 2,932,042
Patented Apr. 12, 1960

2,932,042

MEAT CLEANING MACHINE

Kenneth H. Scott, Oklahoma City, Okla.

Application February 28, 1957, Serial No. 643,186

5 Claims. (Cl. 15—3.17)

The present invention relates to a meat cleaning device and is a continuation-in-part of my application Ser. No. 487,816, filed February 14, 1955, and now Patent No. 2,799,877.

When making desired cuts of meat for retail distribution by a butcher, particularly when power sawing equipment is utilized, particles of bone dust, fat and the like smear and cling to the surface of the meat thereby reducing the attractiveness of the cut for display and sale. As a consequence, it is customary at almost all markets selling any quantity of meat to remove this clinging bone dust and fat smear from the meat surface before displaying or packaging the same, and this is conventionally done either by wiping the meat with rags or scraping its surface with various types of hand implements. The operation is unsatisfactory, slow and tedious and requires considerable time in its performance.

The primary object of the present invention is to provide a machine which is power actuated and capable of satisfactorily cleaning the surface of cuts of meat of bone dust and fatty deposits without injuring the meat structure.

The invention has for a further object the provision of a flat surface, including a supporting grill, over which the meat may be moved into contact with a power brush, the latter projecting through the open grill for contact with the meat for cleaning the same.

A further object of the invention is the provision of adjusting means for the flat meat supporting surface, whereby this surface may be moved with respect to the brush bristles of the power brush to provide the most efficient contact between the brush and the meat for accomplishing the desired function.

Another object resides in the provision of adjustable scraping means for the brush and a removable refuse collection pan beneath the brush into which the refuse and foreign particles are deposited during operation of the machine.

Further objects of the invention will more clearly hereinafter appear by reference to the accompanying drawings forming a part of the instant specification and wherein like characters of reference designate corresponding parts throughout the several views, in which.

Figure 1:
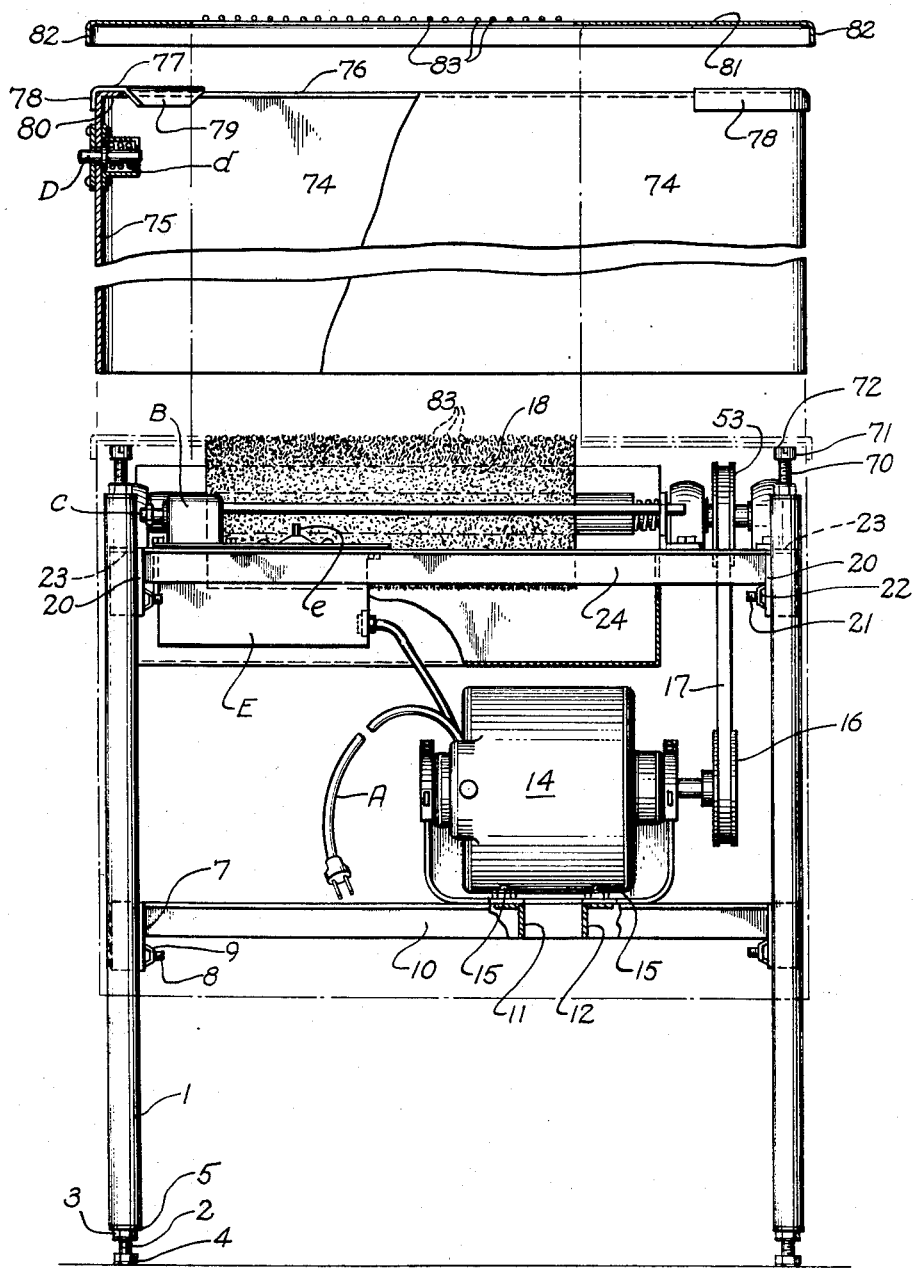
Fig. 1 is an exploded end elevation partly in section showing the assembly.

The supporting structure includes four corner posts 1, these posts having at their lower ends the threaded screws 2 adjustable within the post and locked into position by lock nuts 3 to form adjustable feet. The screws 2 have their heads 4 preferably relatively large to provide sufficient area for supporting the structure. A lock washer 5 is provided between the lock nut 3 and the bottom end of the posts 1 for facilitating the operation and adjustment of the parts. Medially of the post structures are a series of angle plates 7 which are clamped into position on the posts 1 by the bolts 8 and lock nuts 9. The angle plates 7 are positioned at uniform vertical height to provide flat faces against which the angular cross braces 10 are positioned and secured as by welding. The braces 10 provide a rectangular frame for rigidly positioning and holding the posts 1. Connecting the longitudinal frame members 10 are a pair of cross connections 11 and 12, these cross connections being of angular form with the horizontal flange of each of the cross connections lying flush with the upper faces of the cross braces 10 to provide a platform upon which is mounted the motor 14, the motor support being secured to the cross connections 11 and 12 by vertical bolts 15, as shown in Fig. 1. The structure of the motor and the motor support is conventional and this motor is provided with a pulley 16 which drives a belt 17 for actuating the rotary brush 18 to be hereinafter described.

At the upper portion of the posts 1 additional angle plates 20 are provided, these angle plates being secured by the screws 21 and lock nuts 22 to the upper end portions of the posts to provide connections for the ends of the upper frame which is constructed substantially with the same parts as the lower frame, i.e. a pair of end connections of angle form shown at 23 and a pair of side frame members 24. The ends of these connections 23 and 24 are welded to the upper ends of the angle braces 20 so as to provide flush horizontal surfaces. A pair of inwardly facing angle members 25 and 26 connect the upper side frame members 24 near one end to provide a platform to assist in supporting the brush assembly and mounting therefor. A longitudinal brace 27 is spaced from one of the side frame members 24 and connects an end member 23 with the cross brace 25 to provide a support for the switch and cut-out mechanism generally indicated at 30. The longitudinal brace 27 also provides a support for one side of the refuse pan indicated generally at 31. This refuse pan comprises a bottom wall 32, a side wall 33 having offset shoulder 34, and vertical wall portion 35 at one side and outwardly inclined upwardly extending wall 36 having offset shoulder 37 mounted on the cross member 27 and upright marginal edge portion 38. The upright marginal portions 35 and 38 extend from the shoulders 34 and 37 vertically above the frame as defined by the angle braces 23 and 24, this pan being supported at one side by the shoulder 34 resting on the angle brace 23 and at the other side by the shoulder 37 resting on the cross brace 27. The side walls 39 of the pan are flush with the inner faces of one end cross member 23 and the inner cross brace 25, both of which have their upright flanges spaced inwardly to provide supporting areas for the ends of the pan.

The brush includes a core 40 and bristles which may be formed from nylon as shown at 41. The core 40 terminates at each end in clutch members 42 which are shaped for interengagement with similar clutch members 43 and 44. The clutch member 43 is formed at the end of a shaft 45, the latter mounting a bearing 46 carried in support 47 secured by bolts 48 to the end frame member 23. The clutch member 44 is mounted on the end of a sliding shaft 50 mounted in bearings in the brackets 51 and 52, the former being on the outer cross brace 25 and the latter being on the adjacent end frame member 23. A pulley 53 is fixed to the sliding shaft 50 and this shaft 50 is normally positioned with the pulley 53 in alignment with pulley 16 by virtue of the coil spring 54, one end of which engages the adjacent face of the clutch section 44 and the other end of which abuts the adjacent bearing face 55 carried in the support 51. By this construction and arrangement of parts the brush can be removed and replaced at any time by disengaging the clutch parts 42 and 44 by axial pressure in the direction of the sliding shaft 50. By axial pressure against the shaft 50 the clutch 42—43 can be disengaged quite readily.

Brackets 56 and 57 are mounted on the end brace 23 and the inner cross brace 25. These brackets are provided with slots 58 and 59 to permit their adjustment and alignment and are secured in position by screws or bolts 60. Each of these brackets is provided with a diagonally positioned slot 61 which receives the cross bar 62 against which the brush works during operation of the assembly. Obviously the cross bar or cleaning rod 61 can be adjusted by moving the adjusting brackets and the engagement between the brush and the cross bar will be such as to provide for a cleaning operation of the bone particles and fat from the brush. At the end of the cleaning rod 61 transverse pins 63 are provided to prevent displacement of the cleaning rod in the direction of its length and from the recesses in the brackets.

Figure 3:
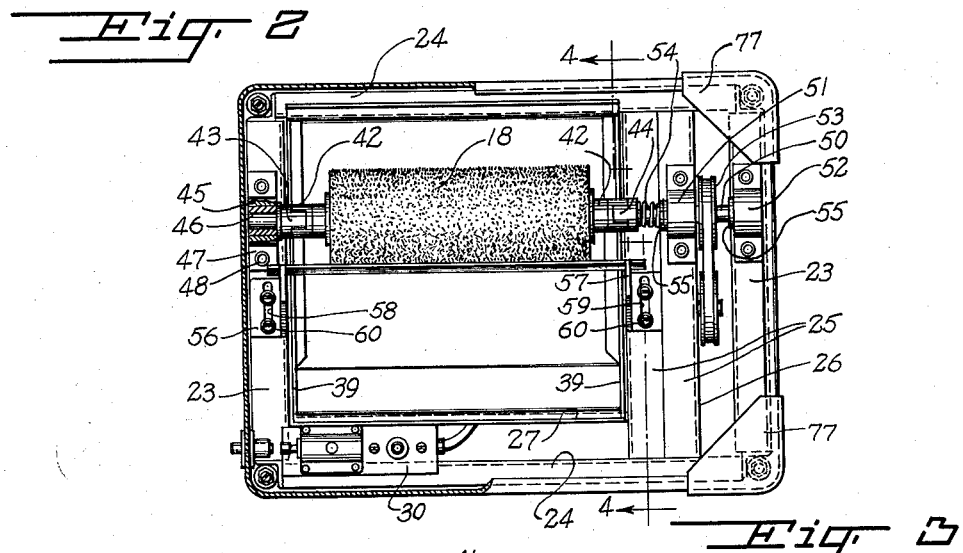
Fig. 3 is a top plan view, partly in section, and with the grill or meat support removed.
Figure 4:
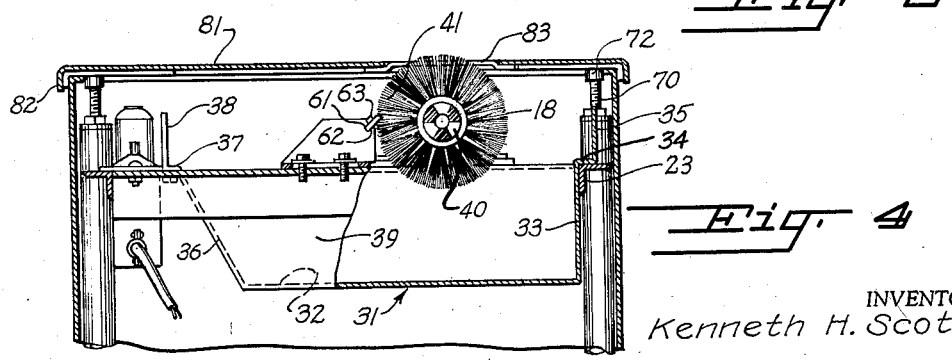
Fig. 4 is a vertical section on line 4—4 of Fig. 3.

Each of the corner posts 1 projects above the upper supporting frame 23—24 and axially positioned vertically adjustable supporting screws 70 are threaded into the vertical centers of these posts 1. The tops of the screws 70 are provided with enlarged caps 71 which form supports for the hood which is provided for the assembly. The supporting screws 70 can readily be adjusted by use of a screw driver in the transverse slots 72 formed in the screw heads. When the screws 70 are elevated and appropriately level, the hood shown in the exploded view of Fig. 1 will be slid into position over the top of the machine frame. The hood includes side walls 74 and end walls 75, the top and bottom of the hood being generally open except for inturned marginal flanges 76 about the upper marginal edges of the hood structure. Also at each corner of the hood are the triangular supporting plates 77, best shown in Fig. 3, these plates 77 having outer marginal down-turned flanges 78 which fit about the outer face of the corner of the hood and inner downwardly diagonal tapered flange 79 which partly define a restricted area about the inturned flanges 76 of the hood as indicated at 80 in Fig. 1. These triangular corner members are preferably welded into position and are formed of suitable stiff material so that they will carry the weight of the hood when they rest upon the screw caps 71 of the supporting screws 70.

Figure 2:
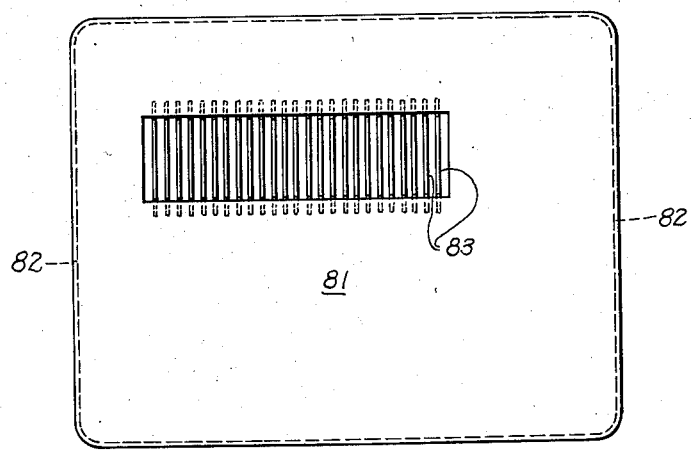
Fig. 2 is a top plan view of the grill.

A cover plate 81 seats on the hood and is held in place by down-turned marginal flanges 82. An elongated portion of the cover plate 81 is cut away and replaced by a grill 83, preferably in the form of spaced parallel wires as shown in Fig. 2, the opening extending the length of the brush area with the wires parallel to each other and arranged in the direction of travel of the brush.

It will be obvious to one skilled in the art that the assembly provides for adjustments permitting the use of the device on irregular surfaces and that the cover plate, including the grill 83, is also mounted on adjustable posts 70 permitting positioning of the grill with respect to the rotary brush 18 so that uniform action of the brush is provided throughout its entire range of operation. The motor 14 is of conventional type and can be plugged into any service line by the extension A shown in Fig. 1. In this Fig. 1 the control for the motor 14 is through a switch contained in the switch box indicated at B, and the control for the switch is through the switch plunger C which is actuated by the push button D shown carried by the hood. The plunger D is normally urged outwardly by a coil spring d and this plunger D is carried by the hood in such a position as to permit the alignment of same to actuate the switch C when the hood is in position on the frame. A circuit breaker mechanism E is associated with the switch B and additional switch e is provided for actuation of the circuit breaker shown generally at E. The circuit breaker is generally conventional for the protection of the equipment and will stop the machine when it overheats.

By the construction shown and described, a device is provided for cleaning cuts of meat by power to insure uniformly clean products for sale and packaging. The device is so constructed that the essential daily cleaning is relatively simple, it being only necessary to lift off the hood as shown in the exploded view of Fig. 1 and then remove the refuse pan 31 which can readily be washed and sterilized. The brush is held in the slip clutches and may be removed by sliding the brush toward the spring urged clutch and lifting the same after disengagement with the fixed clutch terminal. The striker or cleaning bar 61 is likewise removable and can be readily lifted from the notches of the brackets which secure the same in position, it being noted that the slots in these brackets which receive the cleaning bar are at such an angle that the bar will be held in seated position as the brush rotates in counterclockwise position. The brush, of course, can readily be washed by the use of any well known and suitable detergent and there are a group of such detergents which are suitable for use on nylon bristles which are preferable for use in the present assembly.

It will be important to adjust the brush height, i.e. the amount of the brush which projects upwardly through the grill on the top of the machine. This is accomplished by adjusting the support screws 70 which will regulate the height of the hood and the grill supported thereby. The adjustable parts are all provided with lock nuts to insure the fixing of the adjustments. The adjustment of the striker or cleaning bar may also be desirable from time to time as the brush may wear slightly from use. It is important that the striker bar be adjusted so that the bristles will hit the striker bar flush at the front or adjacent edge. The adjustment of the striker bar can readily be accomplished by loosening the bolts 60 of the supporting brackets and sliding the support forward or backward as may be required.

What I claim is:

1. In an apparatus of the type described, a supporting structure including a pair of spaced upper and lower rectangular frames, corner posts supporting said frames, adjustable supporting feet threaded into the lower ends of said posts, threaded members screwed into the upper ends of said posts, a supporting platform carried by the lower frame, a motor mounted on said platform, a pulley driven by said motor, a removable rotatable cylindrical brush supported by the upper frame, axially aligned clutch members engaging said brush at each end, bearings carried by said upper frame mounting said clutch members, a sliding shaft fixed to one of said clutch members, a pulley on said shaft connected by a belt with said first named pulley, a tubular hood slidably enclosing the upper portion of said supporting structure, said hood seating upon the thread members in the upper ends of said posts, and a cover plate on said hood, said cover plate having grilled openings through which said brush partially extends.

2. The structure of claim 1 characterized in that the tubular hood is of rectangular shape and snugly engages the corner posts.

3. The structure of claim 1 characterized in that a refuse pan is provided under the brush and is provided with offset portions overlying and mounted upon portions of said upper frame.

4. The structure of claim 1 characterized in that a pair of brackets are adjustably supported on the upper frame for movement towards and away from the brush, the brackets being provided with aligned angular slots, and a scraper element extending between said brackets and received in said slots, said scraper element engaging said cylindrical brush.

5. In an apparatus of the type described, a supporting structure including a pair of spaced upper and lower rectangular frames, corner posts supporting said frames, threaded members screwed into the upper ends of said posts, a supporting platform carried by the lower frame, a motor mounted on said platform, a pulley driven by said motor, a removable rotatable cylindrical brush supported by the upper frame, axially aligned clutch members engaging said brush at each end, bearings carried by said upper frame mounting said clutch members, a sliding shaft fixed to one of said clutch members, a pulley on said shaft connected by a belt with said first named pulley, a tubular hood slidably enclosing the upper portion of said supporting structure, said hood seating upon the threaded members in the upper ends of said posts, a cover plate on said hood, said cover plate having a grilled opening through which said brush partially extends, and a scraper adjustably carried by the upper frame engaging said brush.

References Cited in the file of this patent
UNITED STATES PATENTS

| | | |
|---|---|---|
| 872,823 | Ketzler | Dec. 3, 1907 |
| 1,567,832 | Broge | Dec. 29, 1925 |
| 1,670,809 | Hormel | May 22, 1928 |
| 1,802,587 | Tavender et al. | Apr. 28, 1931 |
| 2,799,877 | Scott | July 23, 1957 |
| 2,817,862 | Frazho et al. | Dec. 31, 1957 |